US012012179B2

(12) United States Patent
Moses et al.

(10) Patent No.: US 12,012,179 B2
(45) Date of Patent: Jun. 18, 2024

(54) REMOTELY CONTROLLED FLOATING COOLER ASSEMBLY AND METHOD

(71) Applicants: Thomas Lawrence Moses, Greenville, SC (US); Merrill Stuart Ross, New Lebanon, NY (US)

(72) Inventors: Thomas Lawrence Moses, Greenville, SC (US); Merrill Stuart Ross, New Lebanon, NY (US)

( * ) Notice: Subject to any disclaimer, the term of this patent is extended or adjusted under 35 U.S.C. 154(b) by 322 days.

(21) Appl. No.: 16/373,224

(22) Filed: Apr. 2, 2019

(65) Prior Publication Data
US 2020/0317302 A1 Oct. 8, 2020

(51) Int. Cl.
*B63B 22/24* (2006.01)
*B63B 32/70* (2020.01)
*F25D 3/08* (2006.01)
*B63B 35/00* (2020.01)

(52) U.S. Cl.
CPC .............. *B63B 22/24* (2013.01); *B63B 32/70* (2020.02); *F25D 3/08* (2013.01); *B63B 2035/008* (2013.01); *F25D 2300/00* (2013.01); *F25D 2327/001* (2013.01)

(58) Field of Classification Search
CPC ... B63B 22/24; B63B 32/70; B63B 2035/008; F25D 3/08; F25D 2300/00; F25D 2327/001; Y02A 40/963; B63G 2008/005; B63H 2025/028
See application file for complete search history.

(56) References Cited

U.S. PATENT DOCUMENTS

| 4,871,079 | A | * | 10/1989 | Doucette | ................ | A45C 11/22 |
| | | | | | | 220/560 |
| 4,927,041 | A | | 5/1990 | Hepburn | | |
| 6,085,926 | A | | 7/2000 | Weiss | | |
| 6,244,066 | B1 | | 6/2001 | LaRose | | |
| 6,253,950 | B1 | | 7/2001 | Buck et al. | | |
| 7,195,132 | B1 | | 3/2007 | Balam | | |
| 2007/0203623 | A1 | * | 8/2007 | Saunders | ............. | G05D 1/0206 |
| | | | | | | 701/23 |

(Continued)

OTHER PUBLICATIONS

Moon, M. "GoPro makes it easier to share footage as Instagram Stories", https://www.engadget.com/2018-05-01-gopro-share-instagram-stories.html, Published May 1, 2018, Retrieved Sep. 23, 2021. (Year: 2018).*

*Primary Examiner* — Andrew Polay
(74) *Attorney, Agent, or Firm* — Southeast IP Group LLC; Thomas L. Moses

(57) ABSTRACT

A remotely controlled, self-propelled floating cooler includes a main body member that generally has an ovoid shape, as shown, for streamlined movement through the water. The main body member is generally hollow, which allows for ice, drinks, food, and the like to be placed inside of the main body member through an opening or hatch on top. A lid may be removably secured to the opening on top, and preferably includes securing means for maintaining the lid in a closed position, even in rough water. Remotely controlled propulsion means are attached to an underside of the cooler on one end thereof. Other features include an audio receiver with speakers, port and starboard running lights, GPS navigation, submerged spotlights, and video cameras mounted above and below the waterline, all of which may be operated via a remote control device.

10 Claims, 6 Drawing Sheets

(56) References Cited

U.S. PATENT DOCUMENTS

| | | | |
|---|---|---|---|
| 2009/0242570 A1 | 10/2009 | Churchill et al. | |
| 2010/0061711 A1* | 3/2010 | Woodman | B63B 32/70 |
| | | | 396/428 |
| 2010/0252560 A1 | 10/2010 | Churchill | |
| 2013/0239869 A1* | 9/2013 | Hesse | B63G 7/02 |
| | | | 114/330 |
| 2015/0159938 A1* | 6/2015 | Weckerly | H04R 1/028 |
| | | | 381/334 |
| 2016/0257383 A1* | 9/2016 | Masson | B63C 11/49 |
| 2017/0153018 A1* | 6/2017 | Voaklander | F21S 4/10 |
| 2019/0248452 A1* | 8/2019 | Newhall | A47G 23/02 |

\* cited by examiner

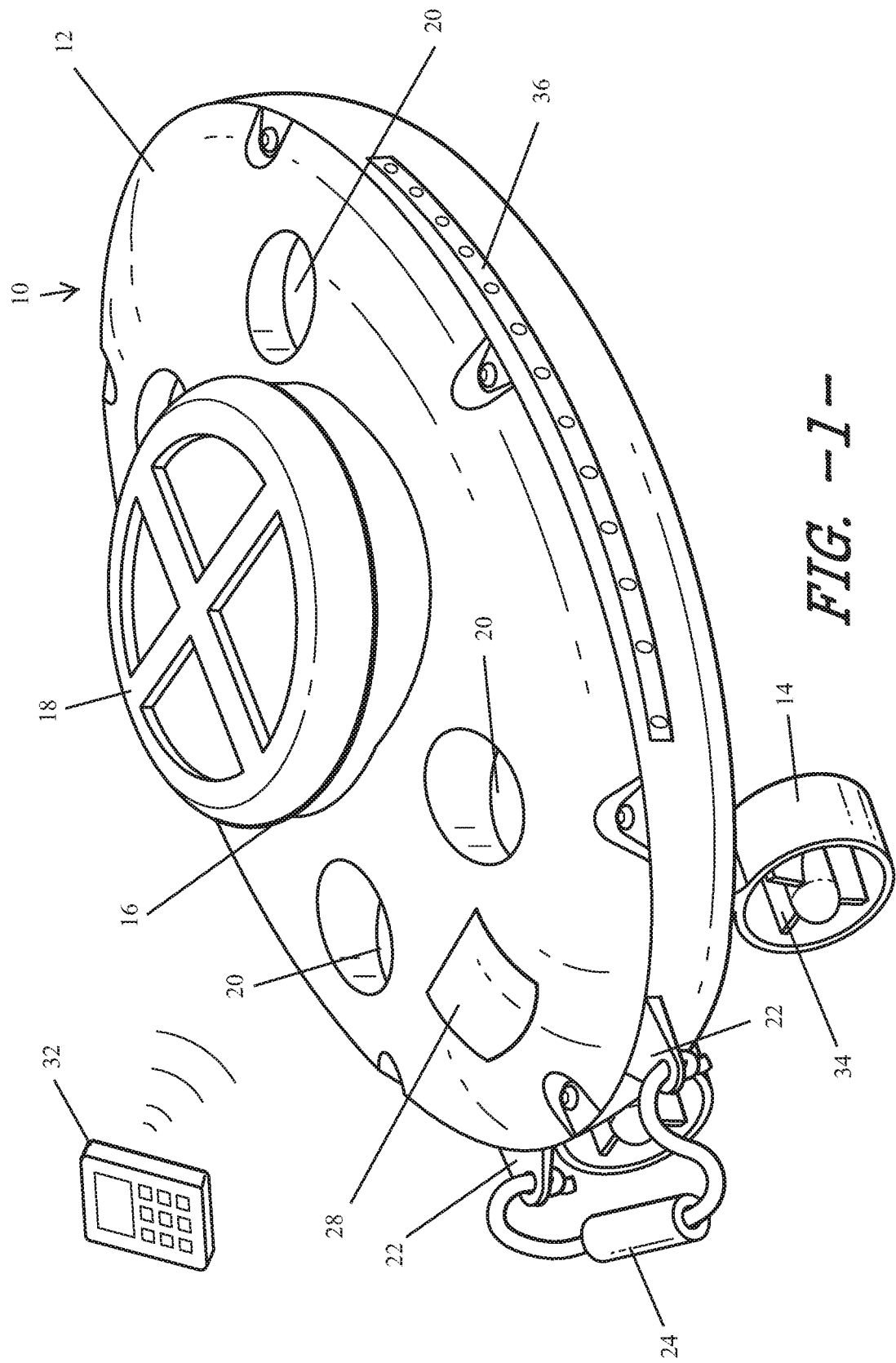
FIG. -1-

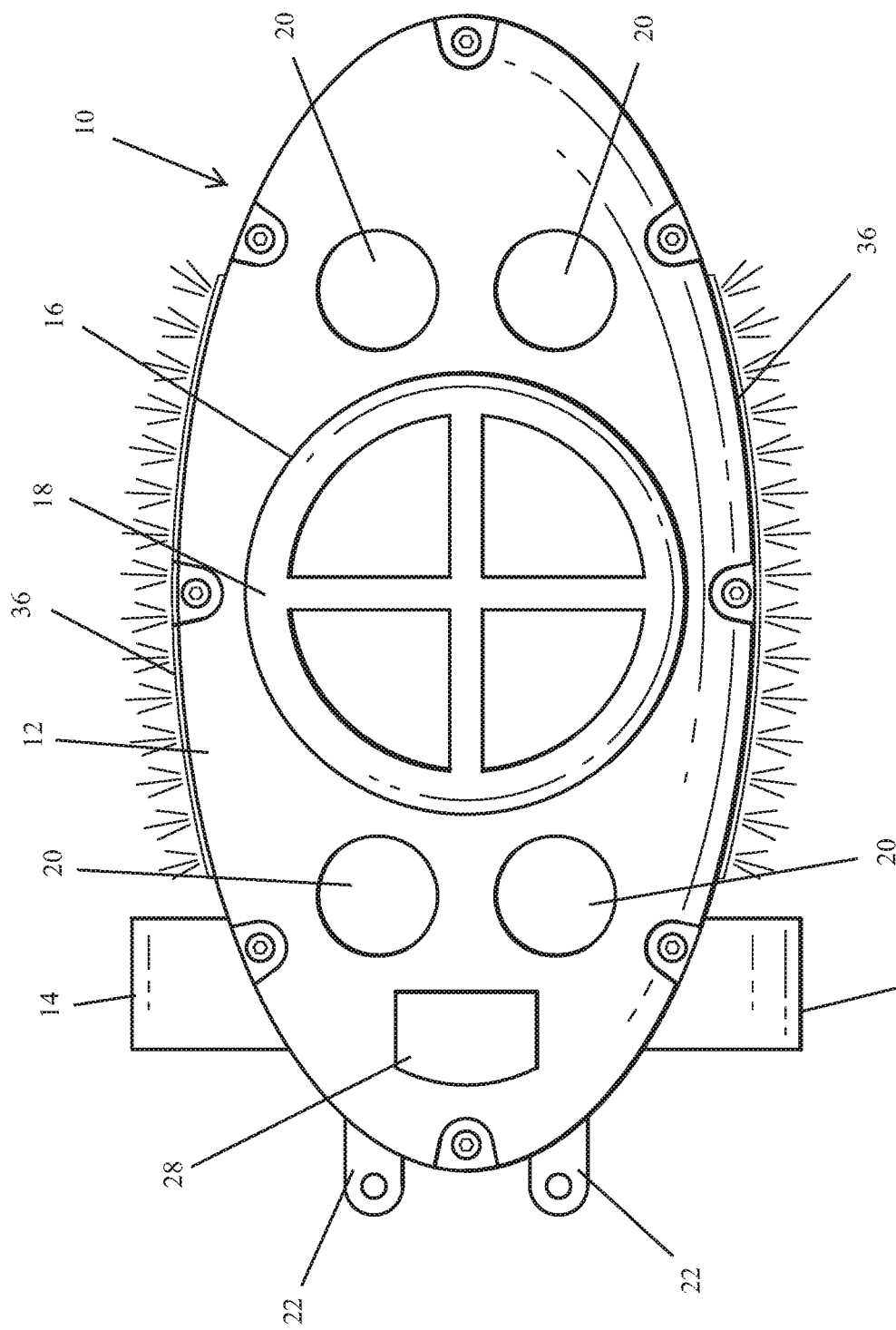

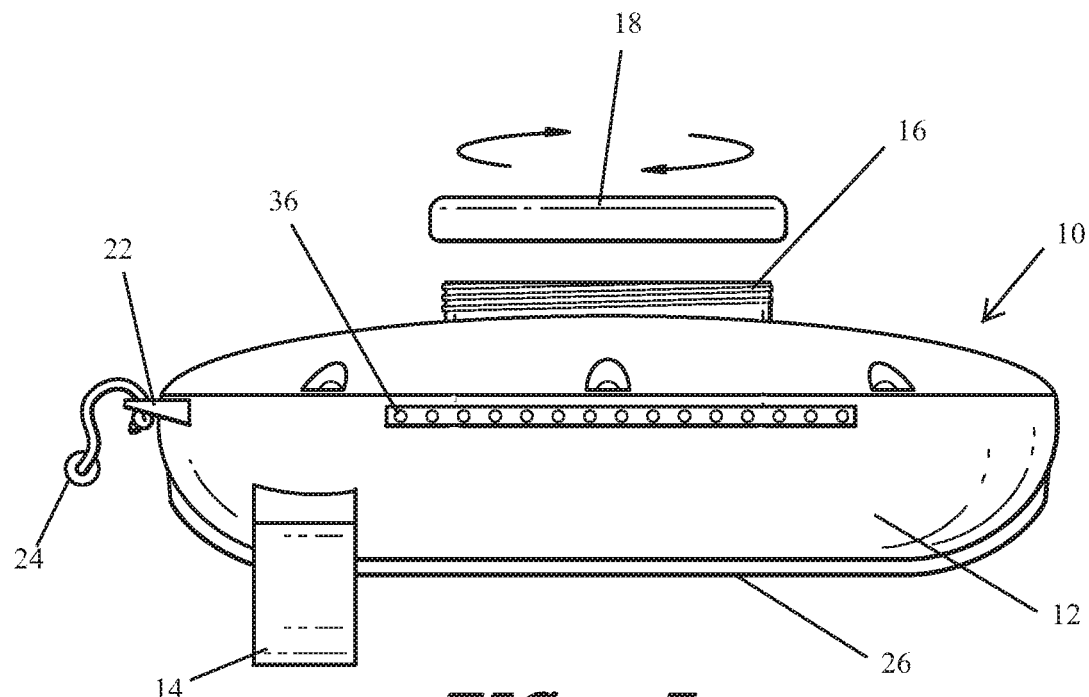
FIG. -3-
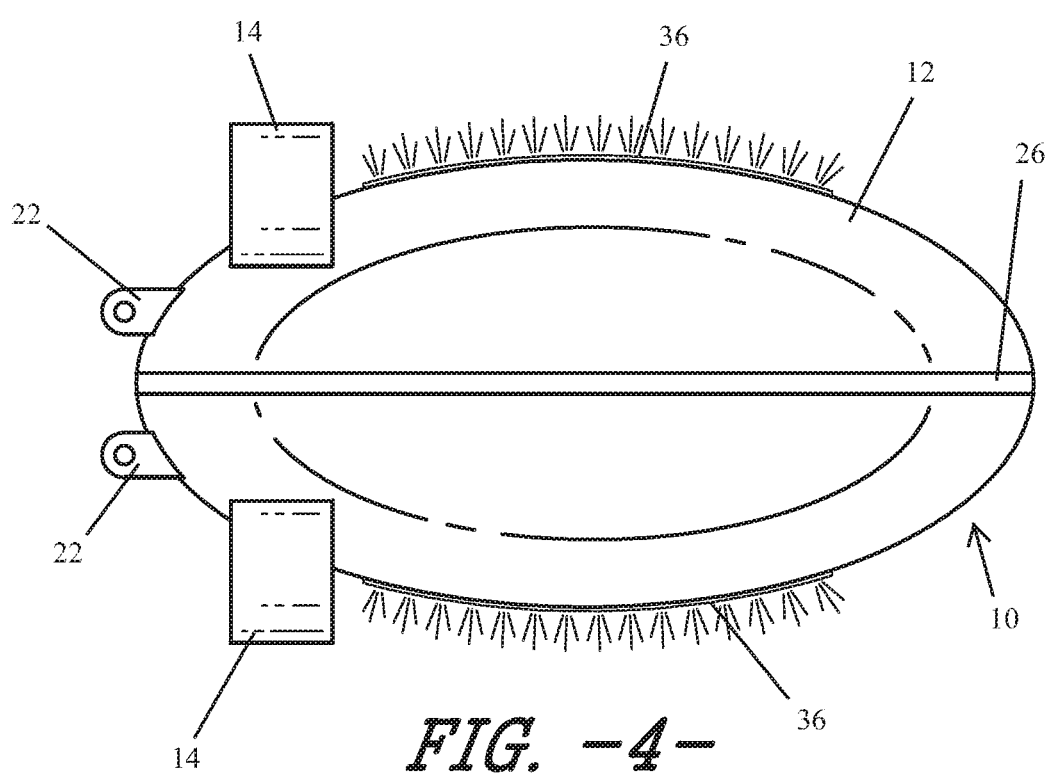
FIG. -4-

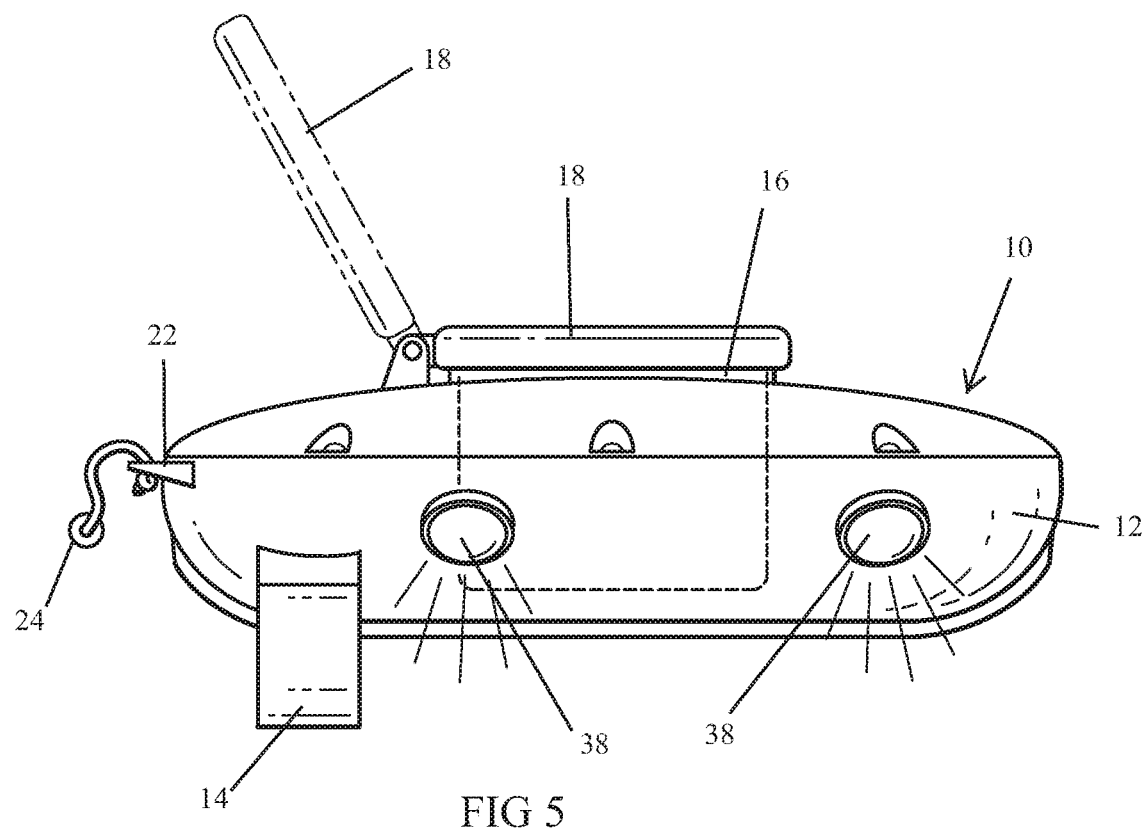
FIG 5
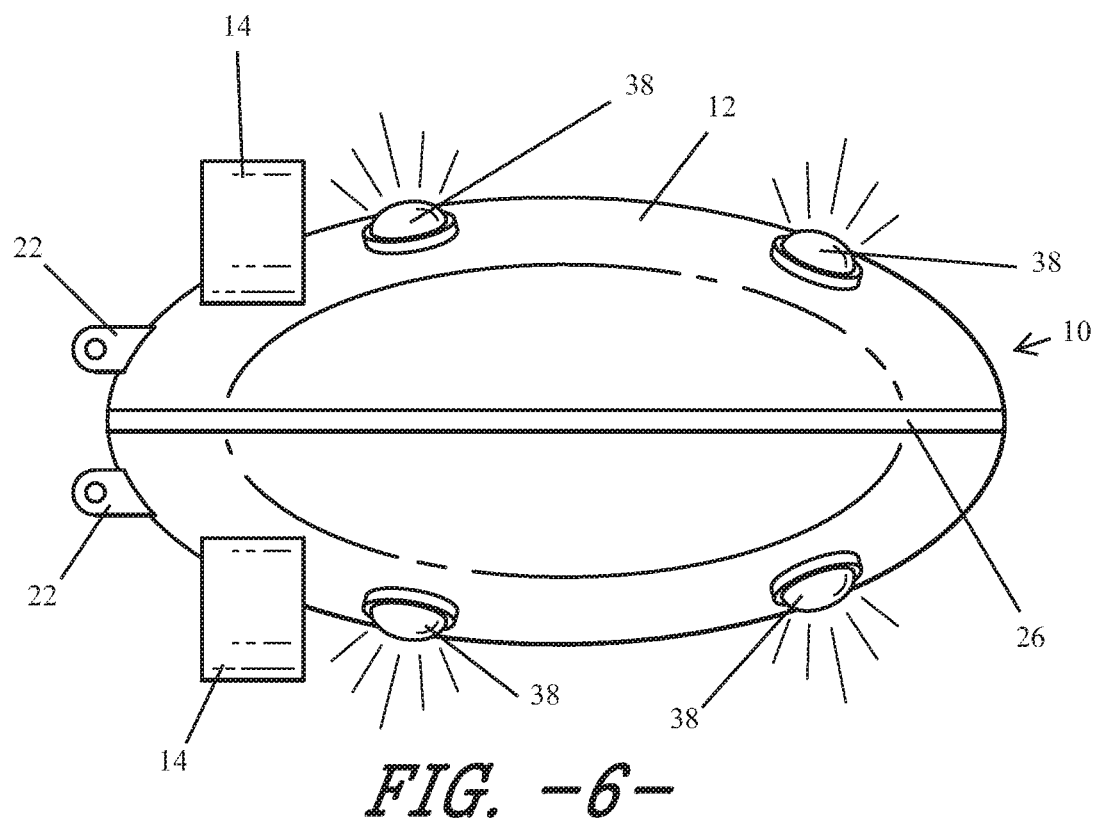
FIG. -6-

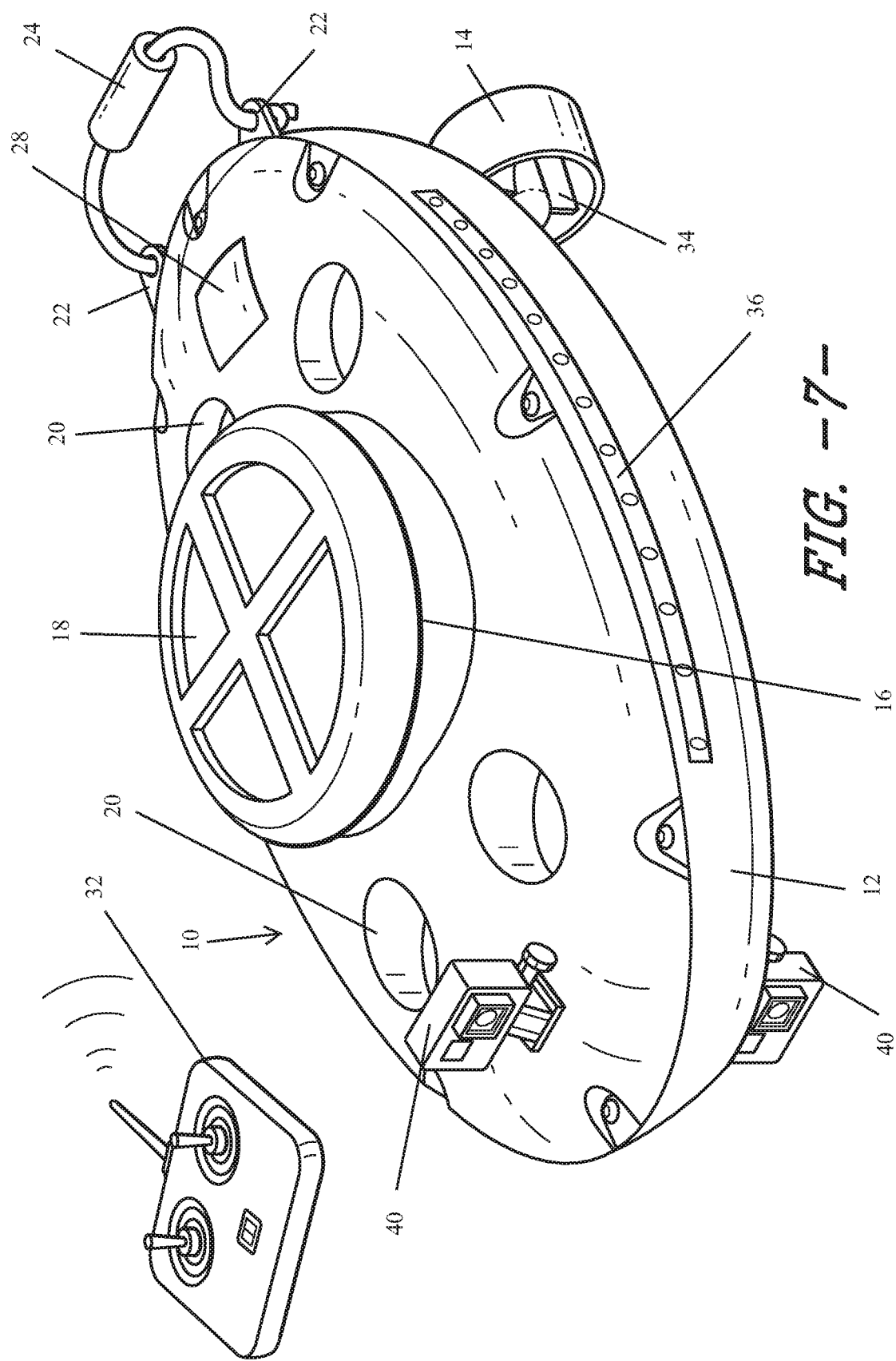
FIG. -7-

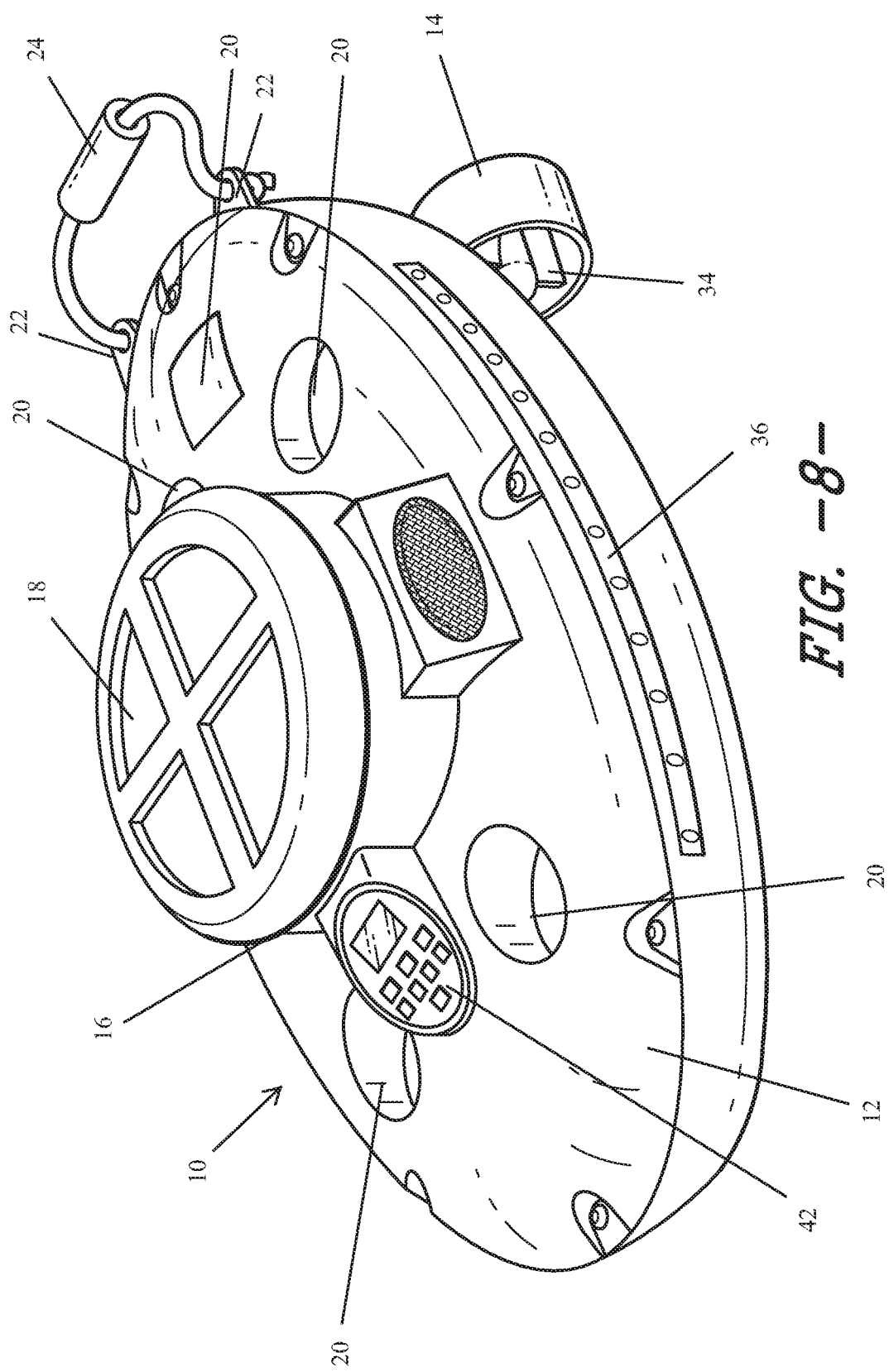
FIG. -8-

REMOTELY CONTROLLED FLOATING COOLER ASSEMBLY AND METHOD

FIELD OF THE INVENTION

The present invention relates generally to buoyant coolers. More specifically, the present invention relates to a remotely controlled floating cooler having thruster means for propelling the floating cooler through water, and a remote control unit for operating the speed and direction of the floating cooler.

BACKGROUND OF THE INVENTION

Heretofore, many different types of floating or buoyant coolers have been developed for water sports and leisure activities. Floating coolers are most useful for providing access to cold drinks to people who are lounging in a pool or lake, or around a dock. Additionally, floating coolers have been developed for specific purposes in mind. For instance, floating coolers have been developed for kayakers, where the cooler is attached to the stern of a kayak and towed while the kayak is being paddled by a user. Towing a cooler behind a kayak solves several problems, including the most obvious issue that most kayaks do not have enough available space on board to attach a cooler having ice, drinks, and possibly food thereon. By towing the cooler behind the kayak, a user is able to bring along a fairly large amount of ice and cold drinks without the cooler becoming unduly burdensome, creating instability, or generally being in the way of paddling and operating the kayak.

The following references disclose examples of various types of floating coolers, and each of these references is hereby incorporated by reference herein:

U.S. Pat. No. 7,195,132 Inflatable Floating Cooler

An inflatable container having an inflatable chamber having a main storage compartment and a main storage compartment access opening, and further having a lower portion that includes at least one storage cavity having a storage cavity access opening. The inflatable container also includes an outer cover formed over the exterior of the inflatable chamber. The inflatable container also provides a storage bag that is formed such that when the inflatable chamber is deflated, the inflatable container may be contained within the storage bag.

U.S. Pat. No. 6,253,950 Floating Cooler

A floating cooler configured in accordance with a predetermined creature configuration is provided which includes a buoyant thermally insulated housing, the housing including a bottom portion, a side portion connected to the bottom portion and extending upward therefrom and forming an open enclosure therebetween, wherein the open enclosure defines a cavity and the housing includes an exterior configuration which is generally shaped as a portion of a torso characteristic of the predetermined creature. The cooler further includes a buoyant thermally insulated lid openably connected to the side portion in a manner to generally seal the open enclosure, wherein the lid includes an exterior configuration which is generally shaped as another portion of the torso which is characteristic of the predetermined creature and at least one buoyant appendage extending from the housing in a manner to aid in stabilization of the housing, wherein the appendage includes an exterior configuration which is generally shaped as an appendage characteristic of the predetermined creature.

U.S. Pat. No. 6,244,066 Floating Cooler

A floating cooler includes a container, a first lid, and a second lid. The container includes a bottom and a peripheral wall extending upward from the bottom. The bottom includes an inside layer, an outside layer, and an insulating layer is disposed between the inside and outside layers. The peripheral wall includes an inside wall, an outside wall, and a combination insulation/air bag layer disposed between the inside and outside walls. A water drain is preferably attached to the peripheral wall at an end, near the bottom thereof. A pair of free swinging handles are disposed on each end of the peripheral wall at substantially a top thereof. The first lid is pivotally attached to the top of the peripheral wall. The first lid is retained against the top of the peripheral wall with a pair of locking latches. An opening is formed through the first lid, the opening is sized to receive the second lid. The second lid is pivotally attached to the top of the first lid. The second lid is preferably secured to the first lid with a sliding locking latch. A second embodiment of the floating cooler does not include the second lid.

U.S. Pat. No. 4,871,079 Floatable Cooler Chest

An integral floating cooler structure including a barge member having a barge bottom and barge sides with a storage chest having a chest bottom formed in common with the barge bottom, and chest sides of less thickness that the barge sides and having lower portions formed in common with the barge sides. The chest bottom and said chest sides are of thickness sufficient to provide thermal insulation. The barge bottom and the barge sides are displacement volume sufficient to provide buoyancy for the cooler structure. The exterior surfaces of the chest sides; the barge sides and the barge bottom forms a common exterior surface for the cooler structure. The interior surface of the chest bottom and the chest sides forms a common interior surface for the cooler structure U.S. Pat. No. 6,085,926 Floating Cooler with Drink Tray A cooler chest is mounted into a lower container which allows the chest to float without tendency for upending or taking on water. The lower container provides openings for resting items such as drink cans and cups, loose change and keys while one plays in the water. The lower container is of such size and buoyant volume as to support the chest when it is filled with water without allowing the items on the lower container to become wet.

U.S. Pat. No. 4,927,041 Self-Stabilizing Floating Cooler

A self-stabilizing floating cooler. The cooler includes a pair of upstanding, opposed end panels and elongated side panels extending therebetween to form a contiguous wall. A lid and a bottom panel are provided, and a floor panel is disposed between the lid and the bottom panel to define upper and lower compartments. The upper compartment is thermally insulated, and float members are detachably affixed to the side panels adjacent the floor panel exteriorly thereof. Perforations are provided in the lower compartment for filling the lower compartment with water to buoyantly stabilize the cooler in an upright position when the cooler is placed on water. Perforations also permit draining the water from the lower compartment when the cooler is removed from water.

U.S. Application No. 2010/0252560 Inflatable Floating Beverage Cooler

A floating beverage cooler apparatus comprises, in an exemplary embodiment, a flotation bladder configured for removably receiving a beverage container. A protective cover is adapted to enclose and cover the flotation bladder and provides a bottom panel spanning an underside thereof. A storage flap is configured to be at least partially removably engaged substantially centrally with the bottom panel such that, when the apparatus is in use, a cavity is formed between the storage flap and bottom panel for providing added stability and resistance against lateral forces. When the apparatus is not being used, and the flotation bladder is deflated, the storage flap may be rotated about the protective cover and re-engaged with the bottom panel so that the storage flap lies over a top surface of the protective cover, thereby enclosing substantially all of the flotation bladder and protective cover, and optionally the beverage container, in a storage envelope.

U.S. Application Serial No. 2009/0242570 Inflatable Floating Cooler

An inflatable container having an inflatable chamber having a main storage compartment and a main storage compartment access opening, and further having a lower portion that includes at least one storage cavity having a storage cavity access opening. The inflatable container also includes an outer cover formed over the exterior of the inflatable chamber. The inflatable container also provides a storage bag that is formed such that when the inflatable chamber is deflated, the inflatable container may be contained within the storage bag.

U.S. Application Serial No. 2007/0035412 Application of Profiles in a Wireless Device to Control a Remote Control Apparatus A system or method for controlling remote controlled apparatus can include a remote controlled apparatus and a remote controlling device. The remote controlling device can include a wireless transceiver for controlling the remote controlled apparatus and a programmable memory for storing profiles defining operation of the remote controlling device corresponding to the remote controlled apparatus. The wireless transceiver receives from the remote controlled apparatus data defining a profile or a selection signal for selecting among a plurality of stored profiles. The remote controlled apparatus can be an RC toy such as a car, boat or aircraft and the remote controlling device can be a phone or other transceiving device. The remote controlled apparatus can include a stored profile that can be modified using an exchangeable housing (26, 28 or 44) having a predefined set of mechanisms for activating switches on the remote controlled apparatus.

Most of the above-referenced documents disclose floating coolers that serve the basic purpose of providing access to cold drinks, food, ice and the like for water sports and other aquatic leisure activities. However, it would be desirable to provide a buoyant cooler that was preferably formed into a streamlined shape that provides minimal resistance when moving through water, and further, that provides the necessary ballast (particularly when filled with ice, drinks, food, and other items of significant weight) so that the cooler remains upright, even in rough water. It would be further advantageous to provide means of powered propulsion, so that the cooler could propel itself through the water. Moreover, it would be desirable to provide a wireless remote control unit that allows the speed and direction of the floating cooler to be controlled remotely by an operator.

BRIEF SUMMARY OF THE INVENTION

In accordance with one aspect of the invention, a first embodiment of a remotely controlled floating cooler includes a main body member that generally has an ovoid shape, as shown, for streamlined movement through the water. The main body member is generally hollow, which allows for ice, drinks, food, and the like to be placed inside of the main body member through an opening or hatch on top. A lid may be removably secured to the opening on top, and preferably includes securing means for maintaining the lid in a closed position, even in rough water. Propulsion means are attached to an underside of the cooler on one end thereof, and the propulsion means are connected to a power source, such as a battery. A transmitter/receiver is also operatively connected to the propulsion means and the power source, so that the propulsion means may communicate wirelessly with a remote control unit. The remote control unit may be used to control the speed and direction of the floating cooler.

Other features may include one or more speakers that are also operatively connected to the power source, and a radio tuner for receiving audio signals through FM/AM radio bands, satellite, WiFi, Bluetooth or any other suitable means for receiving audio signals that may provide music or other audio sounds. In one embodiment, drink holders are provided on an upper surface of the main body member, so that users may place a cup, can, bottle, or the like in the drink holders for temporary storage or transport. Additionally, the floating cooler may include a GPS (Global Positioning Satellite) unit, lights, video camera mounts and cameras (either on an upper portion above the waterline or on an underside for submerged viewing or recording). Each of these components may communicate with and be controlled by the remote control unit.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of a remotely controlled floating cooler having a watertight main body member with an opening on a top portion thereof for receiving ice, drinks, food and the like, a lid that may be removably secured over the opening, an electronics hatch for housing electronics for operating the floating cooler, a plurality of drink holders on an upper surface thereof, a strip of lights on either side of the main body member, a pair of thrusters on a rear underside of the main body member, and a handle member disposed on a rear end of the main body member;

FIG. 2 is a top view of one embodiment of a remotely controlled floating cooler, illustrating the main body member with a series of drink or cup holders on an upper surface thereof along with a lid that is removably secured to an opening for receiving ice, drinks, food and the like, an electronics hatch for housing electronics for operating the floating cooler, a strip of lights running along either side of the main body member, a pair of thrusters disposed on a rear underside of the main body member, and a pair of tabs defining a hole therethrough on a rear portion of the main body member for receiving a handle member;

FIG. 3 is an exploded side view of one embodiment of a remotely controlled floating cooler, showing the main body member, a strip of lights extending along one side thereof, a threaded lid above a complementary threaded opening in the main body member, a thruster having an internal propeller on a rear underside thereof, and a handle member attached to a rear portion of the main body member;

FIG. 4 is a bottom view of one embodiment of a remotely controlled floating cooler, showing the main body member, a center-ridge extending longitudinally along an underside of the main body member, a pair of thrusters attached to an underside of the main body member, and a pair of tabs, each defining a hole, wherein the tabs are adapted to receive a handle member, and a strip of lights extending along either side of the main body member;

FIG. 5 is a side view of another embodiment of a remotely controlled floating cooler, showing a main body member, a pivoting lid that may be removably secured to an opening for receiving ice, drinks, food and the like, a pair of lights positioned on each side of the main body member on an underside thereof, a thruster positioned on rear underside of the main body member, a center-ridge extending longitudinally along an underside of the main body member, and a handle member attached to a rear portion of the main body member;

FIG. 6 is a bottom view of one embodiment of a remotely controlled floating cooler, showing the main body member, a center-ridge extending longitudinally along an underside of the main body member, a pair of thrusters attached to an underside of the main body member, and a pair of tabs, each defining a hole, wherein the tabs are adapted to receive a handle member, and four lights attached to an underside of the main body member;

FIG. 7 is a perspective view of one embodiment of a remotely controlled floating cooler having a watertight main body member with an opening on a top portion thereof for receiving ice, drinks, food and the like, a lid that may be removably secured over the opening, an electronics hatch for housing electronics for operating the floating cooler, a plurality of drink holders on an upper surface thereof, a strip of lights on either side of the main body member, a pair of thrusters on a rear underside of the main body member, a handle member disposed on a rear end of the main body member, a video camera mounted on an upper portion of the main body member, a video camera mounted on a lower portion of the main body member, and a wireless remote control device; and FIG. 8 is a perspective view of one embodiment of a remotely controlled floating cooler having a watertight main body member with an opening on a top portion thereof for receiving ice, drinks, food and the like, a lid that may be removably secured over the opening, an electronics hatch for housing electronics for operating the floating cooler, a plurality of drink holders on an upper surface thereof, a strip of lights on either side of the main body member, a pair of thrusters on a rear underside of the main body member, a handle member disposed on a rear end of the main body member, and a radio/wifi/Bluetooth receiver and speakers attached to an upper portion of the main body member for receiving and playing music and other audio content.

DETAILED DESCRIPTION OF THE INVENTION

A first embodiment of a remotely controlled floating cooler assembly 10 is shown in FIGS. 1-4, and includes a generally water-tight main body member 12 having an ovoid shape to facilitate streamlined movement through water, and a pair of thrusters 16 on an underside of the main body member 12. A main opening 16 in the upper portion of the main body member 12 provides access to the inside of the cooler 10, and is used to place ice, drinks, food and the like into the interior of the cooler 10 for storage and transport. A lid 18 may be removably secured to the main opening 16, in order to maintain a water-tight seal around the main opening 16, and to keep the contents inside of the cooler 10 from spilling out in rough water or waves. In the present embodiment, the lid 18 is threaded, and the outer portion of the opening is also threaded in a complementary manner, so that the lid may be screwed shut, and screwed in the opposite direction for removal. A series of drink holders 20 are disposed on an upper portion of the remote control cooler 10, so that a user may place a cup, can, bottle, or the like into the drink holder 20 for temporary storage.

A pair of tabs 22 are shown extending outwardly from a rear portion of the main body member 12, and each tab 22 defines a hole therein for receiving a handle member 24, as shown. The underside of the main body member 12 may also include a longitudinally extending ridge 26 on an underside thereof, which facilitates travel through the water in a straight line.

An electronics hatch 28 is also provided on an upper portion of the remote controlled cooler, and the electronics hatch 28 may be opened to access a water-tight electronics storage area 30 for carrying various electronic components, including a battery, GPS unit, a receiver/transmitter for communicating with a remote control unit 32, and any other electronics components that are used in the operation of the remote control cooler 10.

A pair of thrusters 14 are positioned on an underside of the main body member 12, and are used to propel and steer the cooler 10 when the cooler 10 is floating in a body of water. Each thruster 14 includes a propeller 34 that may rotate to propel the cooler 10 either in a forward direction or a reverse direction. In this embodiment, steering is accomplished by simply operating the thrusters 14 independently of one another while the cooler 10 is underway and in motion. For instance, in order to turn to the starboard side, the port thruster 14 may rotate in a forward direction and the starboard thruster 14 may rotate in a reverse direction. Alternatively, a starboard turn may be accomplished by having the port thruster 14 rotate the propeller in a forward direction while the starboard thruster 14 is disengaged. Or, the starboard thruster 14 may be engaged in a reverse direction while the port thruster 14 is disengaged. It is contemplated that an onboard programmable logic controller or a digital remote control device 32 (or both) may be programmed to control these types of steering maneuvers, as well as the speed of the thrusters 14, based on movements of one or more joysticks, a touch screen, or other types of controls.

A strip of lights 36 is shown on both sides of the main body member 12. It is contemplated that these light strips may include white lights, colored lights, or may be red on the port side, and green on the starboard side, so that a user or anyone in visual range can tell which direction the remote control cooler 10 is facing or traveling at night. These light strips 36 are operatively connected to the on-board battery or power source.

FIGS. 5 and 6 illustrate another embodiment of the remote control cooler assembly 10, wherein the water-tight lid 18 is hinged, and a plurality of spotlights 38 are disposed on an underside of the main body member. The direction of the spotlights 38 may be adjustable, either manually, or by remote control by using adjustable mounts, possibly in conjunction with servo motors or the like to adjust their position and direction.

FIG. 7 illustrates yet another embodiment of the remote control cooler 10, wherein a camera 40 (preferably a video camera that can also take still photographs) is removably mounted on an upper portion of the main body member 12, and another camera 40 is removably mounted on a lower portion of the main body member 12. The camera(s) 40 may be operated remotely from a remote control device 32, and a user may view the video feed from the camera(s) 40 from a screen, either on the remote control 32 or separately via a wireless connection. It is contemplated that the wireless connection may be any type of suitable communication technology, including radio, wifi, Bluetooth, and the like. The upper camera 40 may be used by a user to maneuver the remote control cooler 10, providing an on-board perspective to a user through a remote screen and/or remote control device 32. The lower camera 40 may be used to view and record scenes below the water line, including fish, coral, and other types of submerged scenes and marine life.

FIG. 8 shows another embodiment of a remote control cooler 10, including an audio receiver 42 that is operationally connected to a pair of speakers 44 for playing music or other audio content. The audio receiver 42 may receive signals through AM, FM, satellite, Bluetooth, wifi, or any other types of signals that may be used to generate sound. The audio receiver 42 may be controlled by pressing buttons on the receiver 42 itself, and/or may be controlled by a remote control device 32, including input selection (Bluetooth, radio, satellite, etc.), volume, and on/off power, as is well known in the art.

It is contemplated that a GPS unit may be integrated into the electronics package, to improve the remote control functionality of the cooler 10. For instance, many trolling motors that are commercially available today have features allowing the motor to be programmed to follow a particular path based on real-time GPS coordinates, and this feature may be implemented into the electronics package of the remote control cooler assembly 10. The system may further include an 'anchor' feature, wherein the GPS unit is operationally connected to the programmable logic controller, for instance, and independently operates the thrusters 14 to maintain a fixed position without using a physical anchor, even in a current or windy conditions. This feature is commonly used on modern trolling motors for boats, and may also be incorporated into the remote control cooler system 10.

The remote control device 32 may be of any desired type, including a standard remote control having a pair of joysticks, as shown in FIG. 7, a smart phone, a computer tablet such as an iPad, a wearable device such as an Apple Watch, or any other suitable remote control device 32. In one embodiment, the system may include commands such as "Home," which will direct the remote control cooler 10 to return to the location of the remote control device 32, or to a programmed location such as a user's dock. It is contemplated that the Home feature may be programmed to an Apple Watch, so that a user floating in the water wearing the Apple Watch (or similar wearable device) may simply press the "Home" icon, and the remote control cooler 10 guides and propels itself to the location of the user with the controlling wearable device.

It is contemplated that the battery that powers the electronics may be rechargeable, and may include a recharge port that is preferably positioned on an upper portion of the main body member, or within the electronics storage area 30 beneath the electronics hatch 28, so that a cord may be plugged into an electrical outlet and connected to the recharge port. It is also contemplated that the battery may be removed from the electronics storage area 30 and placed into a battery recharger separately from the remote control cooler 10. Additionally, solar panels may be affixed to an upper portion of the main body member, or to the lid, and be operatively connected to the battery for recharging purposes. The solar panels may be permanently affixed to the main body member or the lid, or the solar panels may be removably attached thereto.

In another embodiment, rather than including dual thrusters 14, the remote control cooler may include a single thruster 14. In this embodiment, steering may be accomplished by any suitable means, including a remotely controlled rudder, or the thruster 32 itself may be attached to a controlled swivel mechanism and a servo motor or the like for controlling the direction of the thruster 14.

Alternatively, the cooler 10 may include a vertically oriented mounting plate, or other mounting mechanism on the main body member 12, and a remotely controlled trolling motor may be attached to the mounting plate.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A remotely controlled cooler system comprising:
   A buoyant cooler having a generally hollow, insulated main body member and a main opening on an upper portion thereof, wherein said main opening provides access to an interior portion of said main body member for transport and storage of food, beverages and ice;
   at least one thruster attached to an underside of said main body member for providing propulsion in water;
   a lid that is removably securable to said main opening;
   a transmitter/receiver carried by said main body member, wherein said transmitter receiver is operatively connected to said thruster;
   a GPS unit operatively connected to said transmitter/receiver
   a remote control device that wirelessly communicates with said transmitter/receiver, so that said remote control is used to operate said thruster; and
   wherein said remote control includes an anchor command, so that said GPS unit determines a current location of said buoyant cooler and independently operates said thruster to maintain a fixed position at said current location.

2. The remotely controlled cooler system set forth in claim 1, wherein said main body member includes at least one recessed drink holder on an upper portion thereof.

3. The remotely controlled cooler system set forth in claim 1, further including a second thruster attached to an underside of said main body member, and wherein said second thruster is operatively connected to said transmitter/receiver, and wherein said remote control device is used to control said second thruster.

4. The remotely controlled cooler system set forth in claim 1, further including an electronics storage compartment having a water-tight hatch that may be positioned in an open or closed position, and wherein said transmitter/receiver is carried within said electronics storage compartment.

5. The remotely controlled cooler system set forth in claim 1, further including a handle member attached to said main body member.

6. The remotely controlled cooler system set forth in claim 1, further including a strip of lights positioned on a side of said main body member, and wherein said strip of lights is operatively connected to said transmitter/receiver so that said strip of lights may be controlled by said remote control device.

7. The remotely controlled cooler system set forth in claim 1, further including a camera removably attached to said main body member, and wherein said camera may be controlled by said remote control device.

8. The remotely controlled cooler system set forth in claim 1, further including an audio receiver operatively connected to said transmitter/receiver, and further including at least one speaker operatively connected to said audio receiver, wherein said audio receiver and speaker may be controlled by said remote control device.

9. The remotely controlled cooler system set forth in claim 1, further including at least one spotlight attached to an underside of said main body member.

10. The remotely controlled cooler system set forth in claim 9, wherein said spotlight is operatively connected to said transmitter/receiver so that said spotlight may be controlled by said remote control device.

* * * * *